US008705508B2

(12) United States Patent
In et al.

(10) Patent No.: US 8,705,508 B2
(45) Date of Patent: Apr. 22, 2014

(54) METHOD AND SYSTEM FOR PERFORMING TIME SYNCHRONIZATION BETWEEN NODES IN WIRELESS COMMUNICATION SYSTEM

(75) Inventors: Jeong-Sik In, Yongin-si (KR); Hyo-Hyun Choi, Seoul (KR); Bong-Wan Jun, Seoul (KR)

(73) Assignee: Samsung Electronics Co., Ltd. (KR)

(*) Notice: Subject to any disclaimer, the term of this patent is extended or adjusted under 35 U.S.C. 154(b) by 618 days.

(21) Appl. No.: 12/641,864

(22) Filed: Dec. 18, 2009

(65) Prior Publication Data

US 2010/0157975 A1    Jun. 24, 2010

(30) Foreign Application Priority Data

Dec. 18, 2008  (KR) .................. 10-2008-0129251

(51) Int. Cl.
*H04J 3/06*    (2006.01)
*H04W 56/00*    (2009.01)

(52) U.S. Cl.
CPC ......... *H04J 3/0682* (2013.01); *H04W 56/0015* (2013.01)
USPC ......................................................... 370/350

(58) Field of Classification Search
CPC .................. H04W 56/0015; H04J 3/0682
USPC ..................... 370/350, 329, 503, 509
See application file for complete search history.

(56) References Cited

U.S. PATENT DOCUMENTS

| 6,141,337 | A | 10/2000 | Uta et al. |
| 7,738,505 | B2 | 6/2010 | Chang |
| 2004/0240438 | A1* | 12/2004 | Grossman ..................... 370/389 |
| 2005/0232307 | A1* | 10/2005 | Andersson et al. ........... 370/503 |
| 2007/0116064 | A1* | 5/2007 | Kim et al. ..................... 370/508 |
| 2008/0075128 | A1* | 3/2008 | Fourcand ...................... 370/520 |
| 2009/0028092 | A1* | 1/2009 | Rothschild ................... 370/328 |

FOREIGN PATENT DOCUMENTS

| JP | 10-145329 | 5/1998 |
| KR | 1020030091288 | 12/2003 |
| KR | 1020050007826 | 1/2005 |
| WO | WO 2008/138850 | 11/2008 |

* cited by examiner

*Primary Examiner* — Pao Sinkantarakorn
*Assistant Examiner* — Richard K Chang
(74) *Attorney, Agent, or Firm* — The Farrell Law Firm, P.C.

(57) ABSTRACT

A method is provided for synchronizing time between nodes in a wireless communication system. A reference node transmits a first packet to a correspondent node. Upon receiving the first packet, the correspondent node transmits a second packet with a reception time of the first packet recorded therein, to the reference node. Upon receiving the second packet, the reference node calculates a forward delay time using a transmission time and the reception time of the first packet. The correspondent node receives a third packet with the forward delay time from the reference node, and calculates a reverse delay time. The correspondent node calculates an offset value for the synchronization using the forward delay time and the reverse delay time.

16 Claims, 5 Drawing Sheets

METHOD AND SYSTEM FOR PERFORMING TIME SYNCHRONIZATION BETWEEN NODES IN WIRELESS COMMUNICATION SYSTEM

PRIORITY

This application claims priority under 35 U.S.C. §119(a) to a Korean Patent Application filed in the Korean Intellectual Property Office on Dec. 18, 2008 and assigned Serial No. 10-2008-0129251, the contents of which are incorporated herein by reference.

BACKGROUND OF THE INVENTION

1. Field of the Invention

The present invention relates generally to a method and system for performing synchronization between nodes in a wireless communication system, and more particularly, to a method and system for performing time synchronization between nodes in a wireless communication system.

2. Description of the Related Art

Ubiquitous networking, which has recently been attracting public attention, has also been increasingly intellectual and autonomous and has created new ubiquitous services over networks, including business activity services related to production and distribution, welfare services regarding medical care and medical treatment, and environmental services. Due to these advances, ubiquitous networking has come into the spotlight as a technology increasing the comfort of human lives.

In implementations of ubiquitous networking, synchronization should be performed between timers provided in nodes in order for the nodes to perform a predetermined operation at a scheduled time. Further, time synchronization is performed between two communication nodes that wirelessly communicate with each other.

According to basic principles of performing synchronization between nodes, a node (hereinafter referred to as a "reference node"), which is a basis or source of the synchronization, informs other nodes (hereinafter referred to as "correspondent nodes") of a time of a timer of the reference node, so that each of the correspondent nodes may match its own correspondent node time to the time of the reference node. A time delay occurs in the synchronization process where the reference node reads a time from its timer, records the time in a packet and transmits the packet to inform other nodes of the time, and then a correspondent node receives this packet and reads the time recorded in the received packet. Assuming that a time delay occurring in the process where the reference node reads its own timer at a time T and transmits a packet with the time T included therein to a correspondent node, and the correspondent node receives the packet and reads the time T from the received packet is defined as D, since the time the correspondent node reads the time T is T+D, the correspondent node should match its time not to T, but to T+D. Therefore, for exact synchronization between the reference node and the correspondent node, it is necessary to know a value of the D. Two methods for finding this delay value are described as follows.

In a first method used in accordance with Institute of Electrical and Electronics Engineers (IEEE) 802.11, which is one of a plurality of typical wireless network standards, a delay time occurring in a reference node and a correspondent node is measured in advance of manufacture. The first method further includes compensating the measured value and reading/writing the compensated value during packet transmission/reception between the reference node and the correspondent node. Since the delay time must be measured by a hardware maker and then input into the hardware, this method cannot be used if the hardware does not support this function.

A second method includes measuring packet transmission/reception times between a reference node and a correspondent node, and then determining a delay time through calculation. More specifically, if a reference node records a transmission time in a packet and transmits the packet to a correspondent node, the correspondent node receives the packet and subtracts the transmission time written in the packet from a reception time of the packet, thereby finding a difference between the two times. The difference between the two times includes both a time taken for the transmission of the packet and a time difference between timers in the reference node and the correspondent nodes. As to the time difference between timers, its sign (+ or −) is determined according to whichever node has a faster time. By contrast, if a correspondent node records a transmission time in a packet and transmits the packet to a reference node, the reference node calculates a difference between a reception time and the transmission time of the packet. Similarly, the calculated time difference includes both a transmission delay time of the packet and a time difference between the two nodes, and a sign of the time difference is opposite to that of the time difference, which is determined above. Therefore, the inter-node time difference is cancelled out by adding the calculated two time differences and dividing the added time by 2, thereby making it possible to find a physical delay time. Further, by subtracting the two time differences from each other and dividing the subtracted time by 2, it is possible to determine, according to a sign ('+' or '−') of the subtracted time differences, which one of the two nodes is faster than the other one of the two nodes. Accordingly, the correspondent node can set its time equal to the time of the reference node by subtracting or adding the time difference between the two nodes from/to the timer of the correspondent node. The time difference between two nodes will be referred to herein as an "offset."

The first above-described method of measuring a delay time in advance and inputting the measured delay time in the hardware during hardware manufacturing cannot be used in a communication system that does not support this method, such as IEEE 802.15.4, since the hardware must support this function. Therefore, when such a method cannot be used, the second method can be used that corrects timers by calculating a time difference between timers in two nodes based on the transmission/reception time difference of a packet.

A conventional method of correcting timers by calculating a time difference between timers in transmission and reception nodes, i.e., a method of performing time synchronization between nodes is described as follows with reference to FIG. 1. FIG. 1 illustrates a process of performing time synchronization between nodes in a general wireless communication system.

Throughout this specification, $T_{reference}$ denotes a time that a timer in a reference node (or a transmitting node) indicates at a particular time, and $T_{correspondent}$ denotes a time that a timer in a correspondent node (or a receiving node), which is a target of the synchronization, indicates at a particular time.

Inter-node synchronization starts in step 101. Then, a reference node 100 reads the current time of the reference node 100 in step 103. The current time of the reference node 100 is defined as a time that a timer in the reference node 100 indicates at a time $s_1$, and is defined as $T_{reference}(s_1)$. The reference node 100 records the $T_{reference}(s_1)$ in a packet in step 105, records the packet with $T_{reference}(s_1)$ recorded therein in a hardware transmission buffer in step 107, and transmits the recorded packet to a correspondent node 120 using Carrier Sense Multiple Access (CSMA) in step 109.

Upon receiving the packet, the correspondent node 120 reads a reception time of the packet with $T_{reference}(s_1)$ recorded therein. The reception time of the packet with $T_{reference}(s_1)$ recorded therein is defined as a time that a timer in the correspondent node 120 indicates at a time $r_1$, and is defined as $T_{correspondent}(r_1)$. The correspondent node 120 can find an offset value using the $T_{correspondent}(r_1)$ and the $T_{reference}(s_1)$. The offset value is a time difference between a time of the correspondent node 120 a time of the reference node 100, and can be expressed as Equation (1) below.

$$\text{Offset} = T_{correspondent}(r_1) - T_{reference}(r_1) \quad (1)$$

A time delay from the time that the transmission time of the packet was read by the reference node 100 until the time that the reception time of the packet was read by the correspondent node 120 is defined as $D_{forward}$, and it can be expressed as shown in Equation (2) below.

$$D_{forward} = T_{reference}(r_1) - T_{reference}(s_1) \quad (2)$$

Equation (3) below can be obtained by adding Equation (1) to Equation (2).

$$\text{Offset} + D_{forward} = T_{correspondent}(r_1) - T_{reference}(s_1) \quad (3)$$

Because $T_{correspondent}(r_1)$ is a value read by the timer in the correspondent node 120 and $T_{reference}(s_1)$ is a value recorded in the received packet, the correspondent node 120 can obtain Equation (4) below. Herein, a value of the $D_{forward}$ to which the offset value is added is defined as a forward delay time, which is denoted by F in Equation (4) below.

$$F = \text{Offset} + D_{forward} \quad (4)$$

After step 121, a process of finding a reverse delay time from the correspondent node 120 to the reference node 100, which corresponds to the operation of finding the forward delay time, is performed.

The correspondent node 120 reads the current time in step 121. The current time of the correspondent node 120 is defined as a time that a timer in the correspondent node 120 indicates at a time $s_2$, and is defined as $T_{correspondent}(s_2)$. The correspondent node 120 records the $T_{correspondent}(s_2)$ and the forward delay time F in a packet in step 123, and records the packet with the $T_{correspondent}(s_2)$ and the F recorded therein in a hardware transmission buffer in step 125. The correspondent node 120 performs CSMA backoff in step 127, and transmits the packet with the $T_{correspondent}(s_2)$ and the F recorded therein to the reference node 100 in step 129.

Thereafter, the reference node 100 can obtain $D_{reverse}$ of Equation (5) below by applying the same operation as the operation of finding the forward delay time. A time delay from the time that the transmission time of the packet was read by the correspondent node 120 till the time that the reception time of the packet was read by the reference node 100 is defined as $D_{reverse}$, and it can be expressed as Equation (5). Herein, a value of the $D_{reverse}$ to which a negative value of the offset value is defined as a reverse delay time, which is denoted by R in Equation (6) below.

$$D_{reverse} = T_{reference}(r_2) - T_{reference}(s_2) \quad (5)$$

Equation (6) below can be obtained using Equation (5) as follows.

$$R = -\text{Offset} + D_{reverse} \quad (6)$$

If the forward delay time and the reverse delay time, delays in both directions, are equal, the offset is calculated using Equation (7) below.

$$\text{Offset} = (F - R)/2 \quad (7)$$

Therefore, the reference node 100 can calculate the offset value using Equation (7). If the reference node 100 informs the correspondent node 120 of the calculated offset value, the correspondent node 120 can determine the correct time of the reference node 100.

However, the bidirectional delays between the reference node and the correspondent node may not be equal. That is, the $D_{forward}$ and the $D_{reverse}$ may not be identical. This may not only result from a hardware difference between the reference node and the correspondent node, but may also occur, because if an interrupt occurs in a period after the reference node and the correspondent node read their current times and before packets are recorded in their hardware transmission buffers, a delay may occur to handle the interrupt. Although the latter case, may not occur frequently, this case does result in increasing synchronization errors.

In some cases, the bidirectional delays may not be identical due to random backoff that is performed before transmission start of a packet. CSMA is a typical media access scheme that is used in an asynchronized wireless network. Such CSMA uses a method of waiting for a random time and monitoring whether a medium is in use before packet transmission, in order to reduce transmission failures which may occur as different nodes simultaneously transmit packets. The operation of waiting for a random time is called "random backoff," and this time is different in every transmission of a packet, causing a change in the bidirectional delays.

Time Division Multiple Access (TDMA) can also be used in wireless networks, and TDMA may further be used, not before, but after synchronization between nodes has been performed. This problem may be solved by performing the time recording after completing a backoff, instead of before the backoff. If a node performs another operation without transmitting a packet immediately after the backoff, a medium that has been empty may change back to an in-use state, causing transmission failure. Therefore, if various types of nodes coexist in the network, a synchronization error may inevitably increase.

In addition to the above-described problems of the conventional methods for time synchronization, every node may have a minute difference in clock frequency of the timer. An error of a clock frequency is called a clock drift. Because of the clock drift, even when synchronization has already been performed once between a reference node and a correspondent node, a time difference may occur again between the reference node and the correspondent node with the passage of time. Since the time difference is very minute but increases a small amount at a time, as time goes by, it becomes necessary to perform a synchronization operation at stated periods in order to maintain a synchronization error below a predetermined level. As a required error limit is lower, synchronization must be performed more frequently, which increases consumption of bandwidth and energy.

SUMMARY OF THE INVENTION

An aspect of the present invention is to address at least the above-mentioned problems and/or disadvantages and to provide at least the advantages described below. Accordingly, an aspect of the present invention provides a time synchronization method and system for providing time synchronization between nodes in a wireless communication system.

Another aspect of the present invention provides a time synchronization method and system capable of preventing out-of-time synchronization, which may occur due to a hardware difference between nodes in a wireless communication system.

Another aspect of the present invention provides a time synchronization method and system capable of preventing out-of-time synchronization between nodes due to an interrupt, which may occur during transmission of a packet in a wireless communication system.

Another aspect of the present invention provides a time synchronization method and system capable of preventing out-of-time synchronization due to a clock frequency difference between timers in a wireless communication system.

In accordance with one aspect of the present invention, there is provided a method for synchronizing time between nodes in a wireless communication system. The method includes transmitting, by a reference node, a first packet to a correspondent node; upon receiving the first packet, transmitting, by the correspondent node, a second packet with a reception time of the first packet recorded therein, to the reference node; upon receiving the second packet, calculating, by the reference node, a forward delay time using a transmission time and the reception time of the first packet; receiving, by the correspondent node, a third packet with the forward delay time from the reference node, and calculating a reverse delay time; and calculating, by the correspondent node, an offset value for the synchronization using the forward delay time and the reverse delay time.

In accordance with another aspect of the present invention, there is provided a wireless communication system for synchronizing time between nodes to perform communication. The system includes a reference node for transmitting a first packet to a correspondent node, recording a transmission time of the first packet, receiving a second packet from the correspondent node, calculating a forward delay time, and transmitting a third packet with the calculated forward delay time to the correspondent node; and the correspondent node for receiving the first packet from the reference node, transmitting the second packet with a reception time of the first packet recorded therein to the reference node, recording a transmission time of the second packet, receiving the third packet from the reference node, and calculating a reverse delay time.

In accordance with further another aspect of the present invention, there is provided a method for correcting a clock drift occurring due to a difference in a clock frequency between nodes after performing synchronization between the nodes. The method includes, if a synchronization is performed a first period of time M after a first synchronization between a reference node and a correspondent node was performed, calculating a difference k between a first offset calculated through the first synchronization and a second offset calculated through synchronization performed after a lapse of the first period of time M; determining a compensation value k/M for the clock frequency difference per unit time; and correcting a clock drift between the reference node and the correspondent node using the calculated k and the determined compensation value, when performing a last synchronization after a lapse of a second period of time N.

BRIEF DESCRIPTION OF THE DRAWINGS

The above and other aspects, features and advantages of certain embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EMBODIMENTS OF THE INVENTION

The following description with reference to the accompanying drawings is provided to assist in a comprehensive understanding of embodiments of the invention as defined by the claims and their equivalents. It includes various specific details to assist in that understanding but these are to be regarded as mere examples. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The present invention is directed to calculating a difference between a packet transmission time measured by a reference node and a packet reception time measured by a correspondent node by exchanging packets with time information included therein between nodes requiring time synchronization, i.e., the reference node (or a transmitting node) and the correspondent node (or a receiving node), in a wireless communication system, calculating a time difference between timers in the two nodes based on the calculated difference, and then correcting the time difference. Since a transmission time of a packet exchanged between two nodes can be read by a reference node, and a reception time of the packet can be read by a correspondent node, one node should transmit its time information to another node in order to calculate a time difference between the two nodes.

Figure 1:
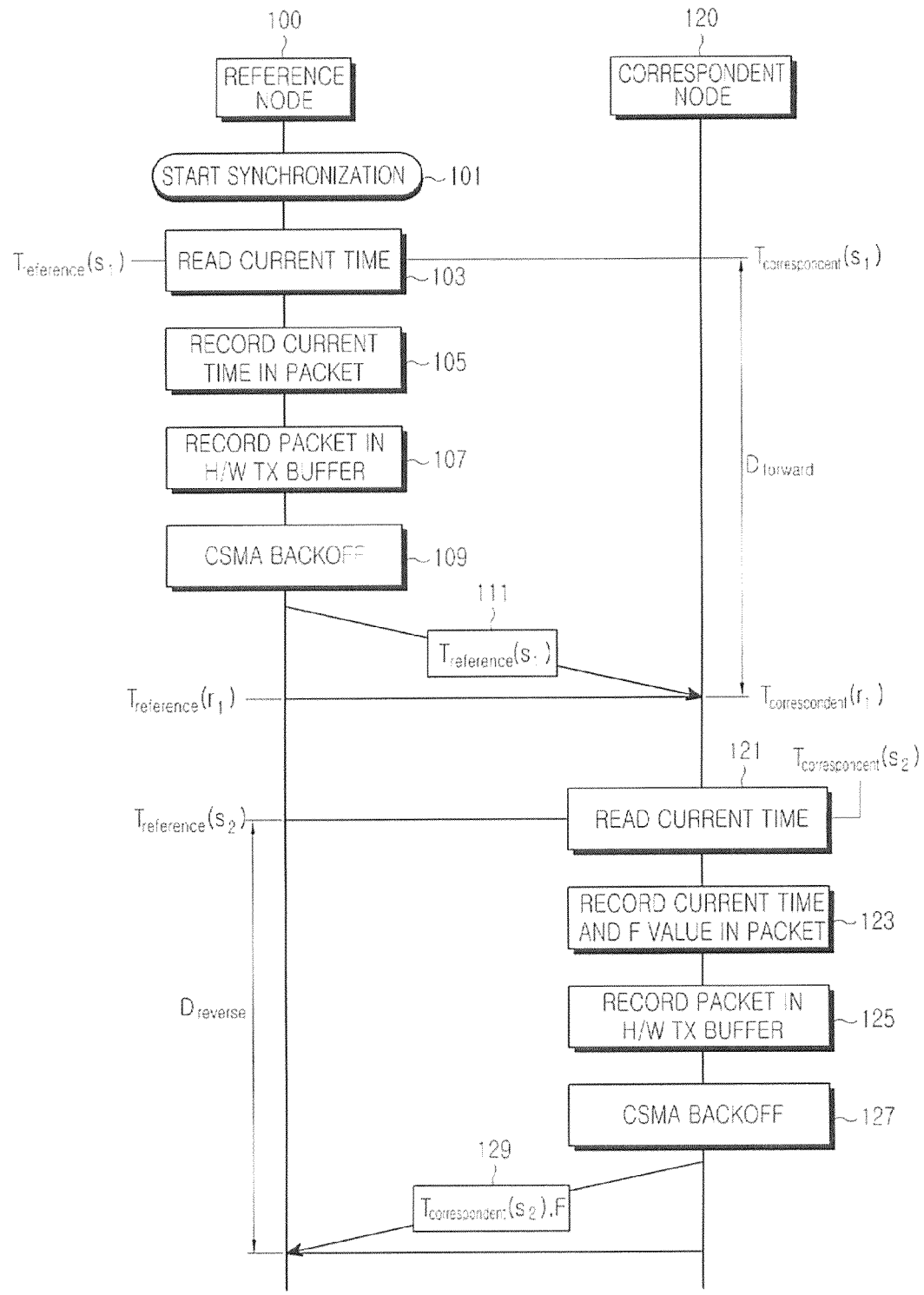
FIG. 1 is a flow diagram illustrating a process of performing time synchronization between nodes in a general wireless communication system.

Compared to conventional methods in which a reference node writes a transmission start time in a packet and transmitting the packet, the present invention provides a method in which a correspondent node informs a reference node of a packet reception time of the correspondent node, instead of the reference node recording transmission time of a packet in the packet and transmitting the packet. Use of the method in which a correspondent node informs a reference node of a reception time of a packet transmitted by the reference node can remove an influence of a time delay due to the hardware difference between the reference node and the correspondent node, to the interrupt that occurs after the reference node read a time of its timer during packet transmission, and to the random backoff as described in FIG. 1.

An embodiment of the present invention will be described as follows with reference to FIGS. 2 and 3.

Figure 2:
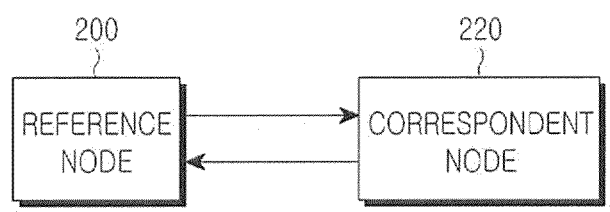
FIG. 2 is a diagram schematically illustrating a reference node and a correspondent node in a wireless communication system to which the present invention is applicable.
Figure 3:
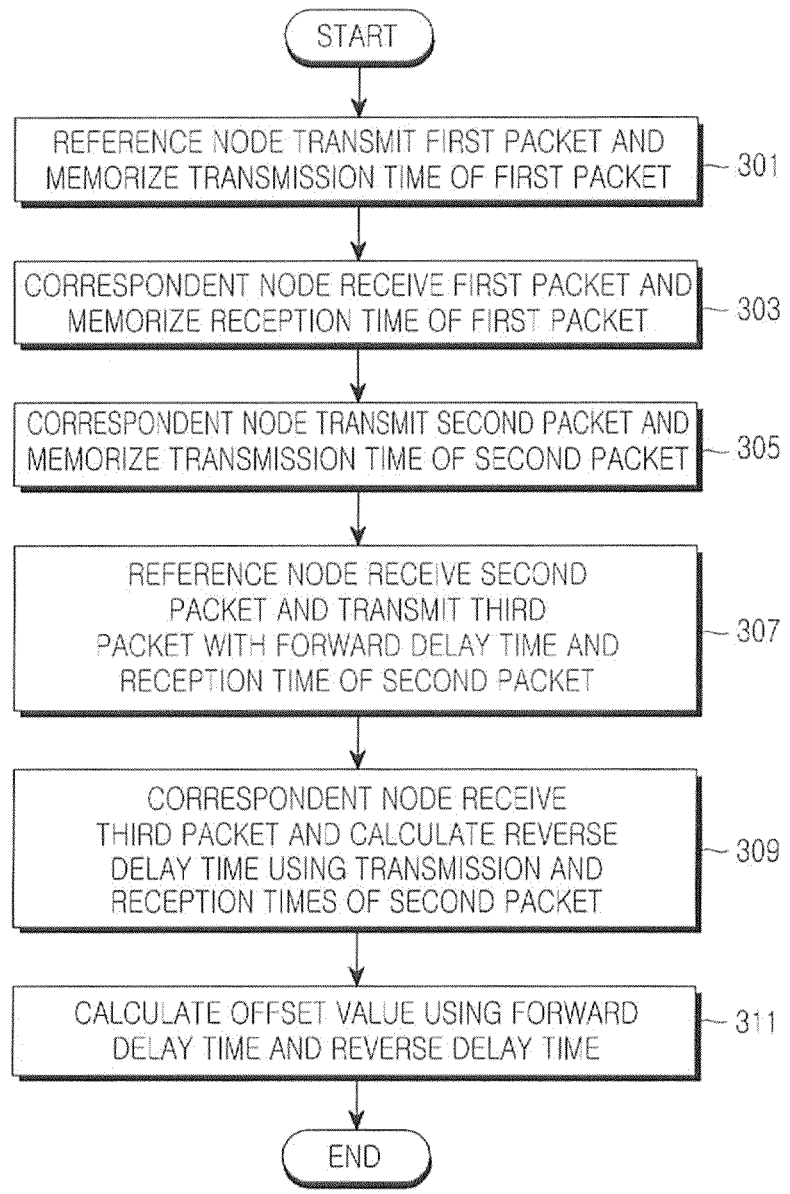
FIG. 3 is a flowchart illustrating a process of performing time synchronization between nodes in a wireless communication system according to an embodiment of the present invention.

FIG. 2 schematically illustrates a reference node and a correspondent node in a wireless communication system to which the present invention is applicable, and FIG. 3 illustrates a process of performing time synchronization between nodes in a wireless communication system according to an embodiment of the present invention.

Referring to FIG. 2, a wireless communication system according to an embodiment of the present invention includes a reference node 200, which is a basis or source during time synchronization between nodes, and a correspondent node 220, which is a target of the synchronization. The correspondent node 220 performs a synchronization operation of finding an offset value to a timer value of the reference node 200 and compensating a timer value of the corresponding node 220 according to the process of FIG. 3.

Referring to FIG. 3, in step 301, the reference node 200 transmits a first packet to the correspondent node 220 and records a transmission time of the first packet. Generally, a packet on a physical layer starts with a preamble allowing a correspondent node to sense the packet and acquire synchronization of a received clock, and with a Start of Frame Delimiter (SFD) indicating a start of the packet. The moment that transmission or reception of the SFD terminates, each node transmitting/receiving the packet generates a particular signal indicating the transmission or reception of the SFD. When the particular signal is generated using a timer having a capture function among the timers used in most processors, the timer stores the time on a hardware basis. As described above, with use of such a timer, the reference node 200 may record an exact time at which main contents of the packet are to be transmitted after termination of the SFD transmission.

In step 303, the correspondent node 220 receives the first packet and stores a reception time of the first packet. Using the same timer as that of the reference node 200, the correspondent node 220 records an exact time at which main contents of the packet are to be received after termination of the SFD reception. In step 305, the correspondent node 220 transmits a second packet with the reception time of the first packet included therein to the reference node 200, and stores a transmission time of the second packet.

In step 307, the reference node 200 receives the second packet, and calculates a forward delay time using the transmission time of the first packet stored in step 301 and the reception time of the first packet's reception. The reference node 200 transmits a third packet with the calculated forward delay time and the reception time of the first packet included therein to the correspondent node 220.

In step 309, the correspondent node 220 receives the third packet with the calculated forward delay time and the reception time of the second packet included therein, and calculates a reverse delay time using the transmission time of the second packet stored in step 305 and the reception time of the second packet included the received third packet. In step 311, the correspondent node 220 calculates an offset value necessary for synchronization, using the forward delay time included in the received third packet and the calculated reverse delay time.

Figure 4:
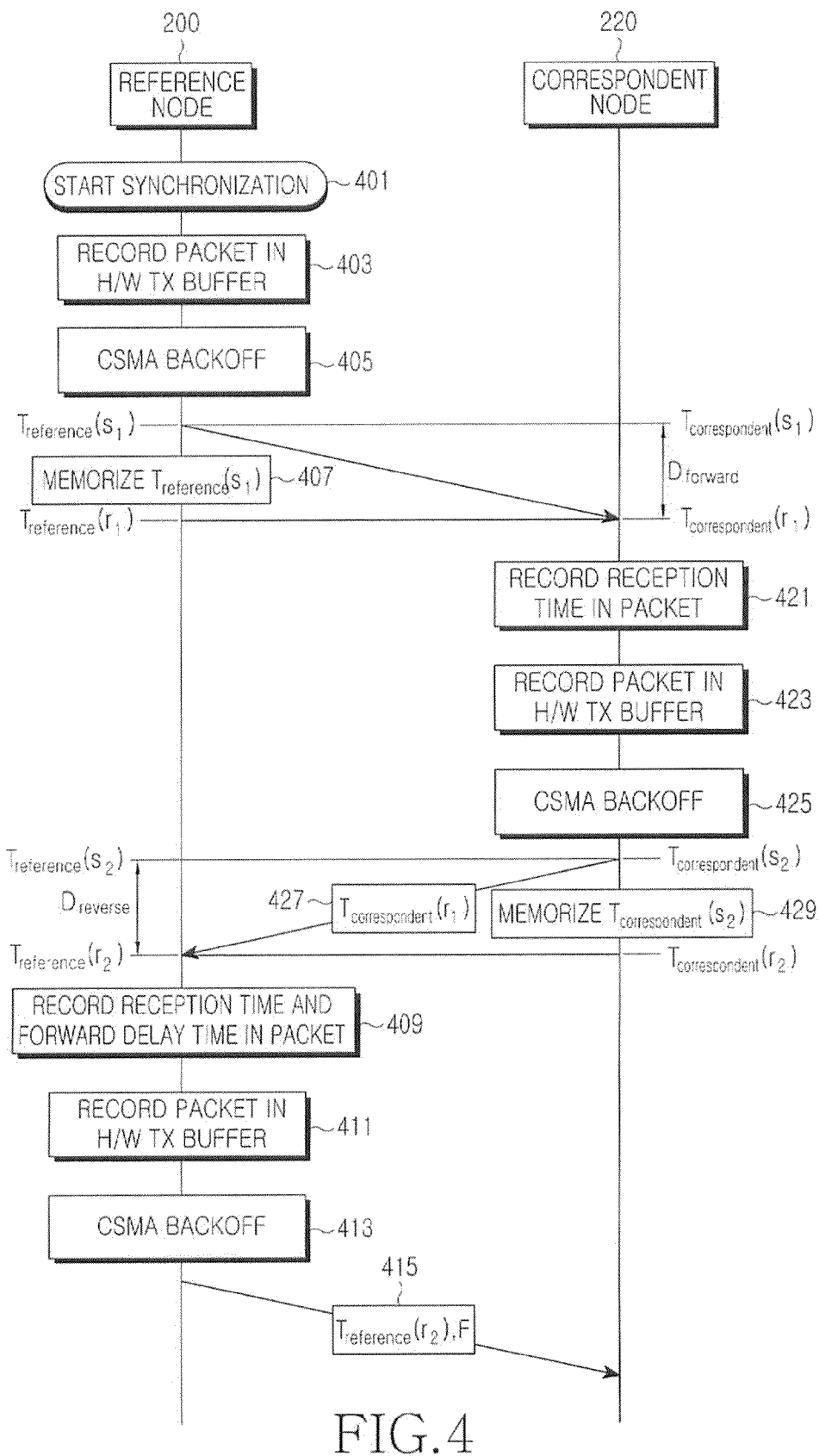
FIG. 4 is a detailed flow diagram illustrating a process of performing time synchronization between nodes in a wireless communication system according to an embodiment of the present invention.

FIG. 4 illustrates a detailed process of performing time synchronization between nodes in a wireless communication system according to an embodiment of the present invention.

Synchronization starts in step 401. Then, the reference node 200 records a first packet to be transmitted in a HardWare (H/W) transmission buffer in step 403. In step 405, the reference node 200 implements a CSMA backoff operation and transmits the first packet to the correspondent node 220. In step 407, the reference node 200 stores $T_{reference}(s_1)$ indicating a transmission time of the first packet.

Upon receiving the first packet transmitted from the reference node 200, the correspondent node 220 records $T_{correspondent}(r_1)$ indicating a reception time of the first packet in a second packet in step 421. The correspondent node 220 records the second packet with $T_{correspondent}(r_1)$ recorded therein in a hardware transmission buffer in step 423, and executes a CSMA backoff operation in step 425. The correspondent node 220 transmits the second packet with $T_{correspondent}(r_1)$ recorded therein to the reference node 200 in step 427, and stores $T_{correspondent}(s_2)$, which indicates a transmission time of the second packet, with $T_{correspondent}(r_1)$ recorded therein in step 429.

Upon receiving the second packet with $T_{correspondent}(r_1)$ recorded therein from the correspondent node 220, the reference node 200 calculates a forward delay time using the $T_{correspondent}(r_1)$ and the $T_{reference}(s_1)$ stored in step 407. Thereafter, in step 409, the reference node 200 records, in a third packet, the calculated forward delay time and $T_{reference}(r_2)$, which indicates a reception time of the second packet, with $T_{correspondent}(r_1)$ recorded therein. The reference node 200 records the calculated forward delay time and the third packet with $T_{reference}(r_2)$ recorded therein in a hardware transmission buffer in step 411, performs CSMA backoff in step 413, and then transmits the third packet with the calculated forward delay time and $T_{reference}(r_2)$ recorded therein to the correspondent node 220 in step 415.

Upon receiving the third packet with the calculated forward delay time and the $T_{reference}(r_2)$ recorded therein from the reference node 200, the correspondent node 220 calculates a reverse delay time using the $T_{reference}(r_2)$ and the $T_{correspondent}(s_2)$ stored in step 429. Thereafter, the correspondent node 220 calculates an offset value necessary for synchronization, using the calculated reverse delay time and the calculated forward delay time. The offset value can be calculated using the forward delay time and the reverse delay time in the conventional method described in FIG. 1.

As described with reference to FIG. 4, the bidirectional delays, i.e., $D_{forward}$ and $D_{reverse}$, do not include delays resulting from the interrupt, hardware differences, random backoffs, or other such conventional delays. Such delays represent a time required when one bit of a packet arrives at a correspondent node after leaving a reference node, and the value of the delay time is a very small value. This value is always shown as a constant value in both directions, unless the distance between the reference node and the correspondent node changes. Thus, Equation (7) is always satisfied.

However, the process of performing synchronization between nodes must be repeated periodically (e.g., repeating over a regular period) due to a clock drift of the timers. As a required synchronization accuracy increases, the synchronization should be performed more frequently. Clock drift occurs due to a clock frequency difference between nodes, but the clock frequency difference remains almost unchanged with the passage of time. Therefore, if a timer in a correspondent node is matched to a timer in a reference node at stated periods by performing synchronization at regular intervals, the offset value that the correspondent node should use for compensation additionally has almost the same value at during most synchronizations.

For example, assuming that synchronization is performed once every 10 seconds, if the timer in the correspondent node was 7 ticks (time unit of a timer) faster after performing the previous synchronization, the timer will typically be about 7 ticks faster even when the correspondent node performs the next synchronization 10 seconds after correcting the clock drift. Based on this, the correspondent node may delay its own timer time at a ratio of 7 ticks per 10 seconds, thereby reducing a synchronization error caused by the clock drift, without performing synchronization for a longer period of time.

Figure 5:
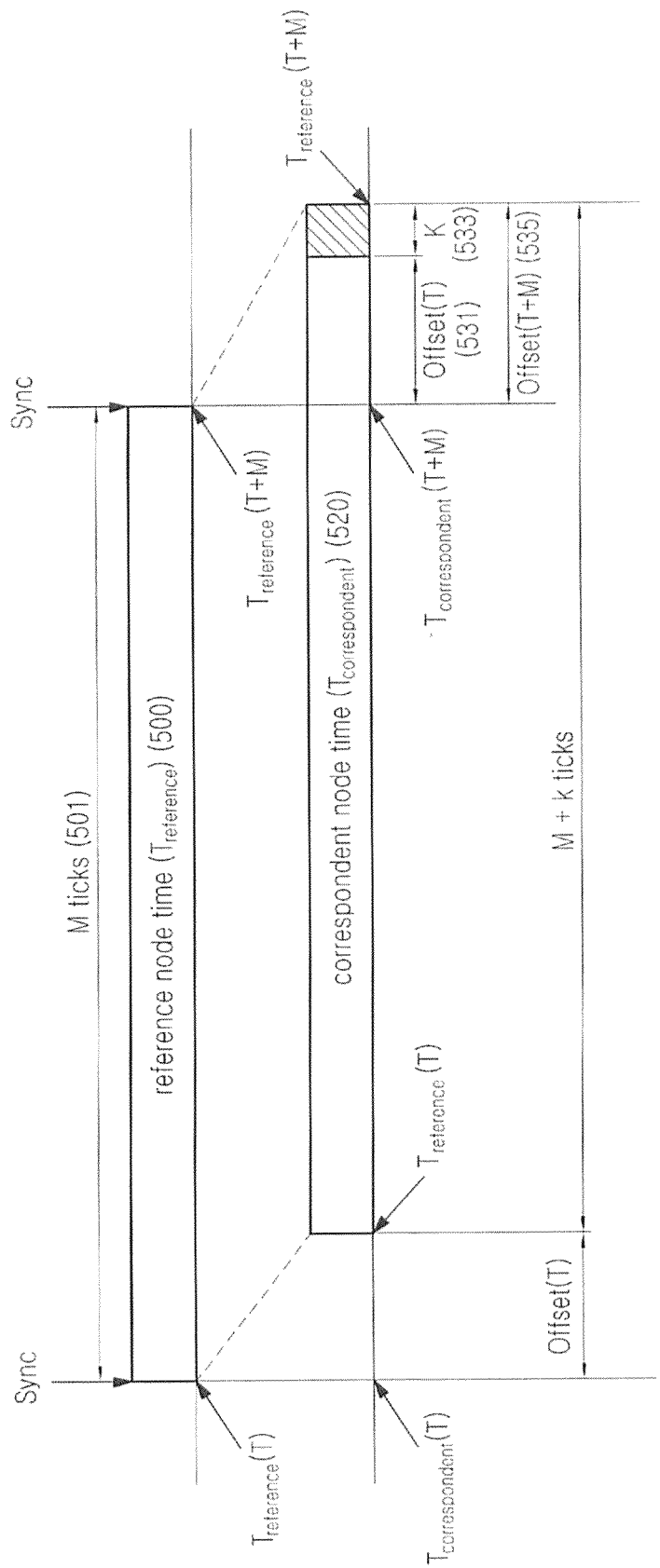
FIG. 5 is a diagram illustrating a method for performing time synchronization between nodes in a wireless communication system according to another embodiment of the present invention.

For this purpose, a difference between the number of ticks of a timer in the reference node, which have passed for a predetermined time, and the number of ticks of the timer in the correspondent node should be calculated in advance. This information can be obtained during the synchronization process. With reference to FIG. 5, a method for notably reducing the frequency of performing synchronization while maintaining the same synchronization accuracy, by correcting the clock drift is described as follows.

FIG. 5 illustrates a method for performing time synchronization between nodes in a wireless communication system according to another embodiment of the present invention. According to the embodiment illustrated in FIG. 5, time synchronization is performed more precisely by compensating the clock drift that occurs due to a frequency difference between timers in nodes.

An offset value 531 calculated in a first synchronization process is denoted by $O_O$ and an offset value 535 obtained in a synchronization process performed after M ticks 501 have elapsed since then with the timer in the reference node is represented by $O_M$. Therefore, a clock tick difference between the two nodes, which occurs over the M ticks 501, is k 533, which is also a difference between $O_M$ and $O_O$.

Since the calculated offset value indicates a time difference between timers in the two nodes, a change in the time difference appears as a change in the offset value. If $O_M$ is equal to $O_O$, which means that the time difference between the two nodes after a lapse of M ticks from the time of the first synchronization is constant, it can be determined that there is no clock drift between the two nodes.

However, if $O_M$ is greater than $O_O$ by k, indicating that the offset value has increased by k ticks over the M ticks 501 of the reference node, then it is determined that the timer in the correspondent node has advanced k ticks less than the timer in the reference node, while the M ticks have passed from the time of the first synchronization. The timer in the correspondent node lags behind the timer in the reference node by k/M ticks per tick. Therefore, if a time of N ticks has passed with the timer in the reference node after the last synchronization process is performed, a time difference between the timers in the reference node and the correspondent node is given as Equation (8) below.

$$T_{reference} = T_{correspondent} + \text{offset} + kN/M \quad (8)$$

Equation (8), 'offset' denotes an offset value calculated in the last synchronization process, and N and M both denote time periods measured by the timer in the reference node. Times that are measured by the timer in the correspondent node for the times corresponding to N and M are different from the above times, but its ratio N/M is equal to that of the reference node. Therefore, Equation (8) may be used by the correspondent node to estimate the time of the reference node while taking the clock drift into consideration.

The correspondent node stores, in a memory, the total number, M, of ticks that have passed on the basis of the timer in the correspondent node in the synchronization process over several periods, and also stores a difference, $k = O_M - O_O$, between the first and last offset values during the time corresponding thereto. Since the clock drift is subject to a slight change according to surroundings such as temperature, M and k should be periodically updated. After the synchronization is finally performed, the correspondent node may calculate a synchronized time $T_{correction}$ in accordance with Equation (9) below after N ticks have elapsed on the basis of the timer in the correspondent node.

$$T_{correction} = T_{correspondent} + \text{offset} + kN/M \quad (9)$$

Assuming that during the following synchronization, a newly calculated offset value is denoted by $O_{new}$, an offset value calculated in the right previous synchronization process is denoted by $O_{old}$, and an offset value right after the synchronization is an error-free correct value, an estimated error right before the synchronization is defined as Equation (10) below.

$$E = O_{old} + kN/M - O_{new} \quad (10)$$

A proper synchronization period can be determined as follows based on a range and a tolerant error $E_{tol}$ of E values that are measured repeatedly. When the E value has been calculated in each synchronization period for a sufficient period of time . . . if $E_{MAX}$, which is an absolute value of the E value, is sufficiently less than $E_{tol}$, the two nodes may further increase their synchronization periods. The two nodes extend their synchronization periods periodically on a regular time basis, as long as the following condition according to Equation (11) is satisfied.

$$E_{MAX} < \alpha E_{tol}, \ (0 < \alpha < 1) \quad (11)$$

In Equation (11), $\alpha$ is a predetermined value calibrating the condition. If $E_{MAX}$ is greater than $\alpha E_{tol}$ at least once in the synchronization process, the synchronization period is reduced by one unit period, and no longer extended. Thereafter, each time $E_{MAX}$ is greater than $\alpha E_{tol}$ again, the synchronization period is again reduced by one unit period.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for synchronizing time between nodes in a wireless communication system, comprising:
   transmitting, by a reference node, a first packet to a correspondent node;
   upon receiving the first packet, transmitting, by the correspondent node, a second packet with a reception time of the first packet recorded therein, to the reference node;
   upon receiving the second packet, calculating, by the reference node, a forward delay time using a transmission time and the reception time of the first packet;
   receiving, by the correspondent node, a third packet with the forward delay time from the reference node, and calculating a reverse delay time; and
   calculating, by the correspondent node, an offset value for the synchronization using the forward delay time and the reverse delay time.

2. The method of claim 1, wherein transmitting the second packet comprises recording a reception time of the first packet by the correspondent node.

3. The method of claim 1, wherein transmitting the first packet comprises recording a transmission time of the first packet by the reference node, and
   wherein the forward delay time is calculated as a difference between the reception time of the first packet and the transmission time of the first packet.

4. The method of claim 1, further comprising storing, by the reference node and the correspondent node, transmission and reception times of a corresponding packet by detecting a Start of Frame Delimiter (SFD) that is included in each of the first to third packets,
   wherein the SFD indicates a start of a corresponding packet.

5. The method of claim 1, wherein a transmission time of the third packet is stored by the reference node when transmitting the third packet.

6. The method of claim 1, wherein transmitting the second packet comprises recording a transmission time of the second packet by the correspondent node;

wherein the reverse delay time is calculated as a difference between the reception time of the second packet and the transmission time of the second packet.

7. The method of claim 1, further comprising compensating a clock drift caused by a clock frequency difference between the reference node and the correspondent node.

8. The method of claim 4, wherein transmitting the first packet comprises storing, by the reference node, a transmission end time of the SFD as a transmission time of the first packet during transmission of the first packet.

9. The method of claim 7, wherein the compensating the clock drift comprises:
   if synchronization is performed a first period of time M after the calculation of the offset, calculating a difference k between the calculated offset and an offset that is calculated through synchronization performed after a lapse of M time;
   determining a compensation value k/M for a clock frequency difference per a unit of time; and
   correcting time synchronization caused by the clock frequency difference between the reference node and the correspondent node using the calculated k and the determined compensation value k/M, when performing a last synchronization after a lapse of a second period of time N.

10. A wireless communication system for synchronizing time between nodes to perform communication, comprising:
   a reference node for transmitting a first packet to a correspondent node, recording a transmission time of the first packet, receiving a second packet from the correspondent node, calculating a forward delay time, and transmitting a third packet with the calculated forward delay time to the correspondent node; and
   the correspondent node for receiving the first packet from the reference node, transmitting the second packet with a reception time of the first packet recorded therein to the reference node, recording a transmission time of the second packet, receiving the third packet from the reference node, and calculating a reverse delay time.

11. The wireless communication system of claim 10, wherein the forward delay time is calculated as a difference between the transmission time of the first packet and the reception time of the first packet.

12. The wireless communication system of claim 10, wherein each of the first to third packets includes a Start of Frame Delimiter (SFD) indicating a start of a corresponding packet, and the reference node and the correspondent node are adapted to detect and SFD in a received packet and store transmission and reception times of a packet corresponding to the detected SFD.

13. The wireless communication system of claim 12, wherein the reference node is adapted to store a transmission end time of the SFD as a transmission time of the first packet during transmission of the first packet.

14. A method for correcting, by a correspondent node, a clock drift occurring due to a difference in a clock frequency between the correspondent node and a reference node, after performing synchronization between the correspondent node and the reference node, the method comprising:
   if synchronization is performed a first period of time M after first synchronization between the reference node and the correspondent node was performed, calculating, by the correspondent node, a difference k between a first offset calculated through the first synchronization and a second offset calculated through a synchronization performed after a lapse of the first period of time M;
   determining a compensation value k/M for the clock frequency difference per a unit of time; and
   correcting a clock drift between the reference node and the correspondent node using the calculated k and the determined compensation value k/m, when performing a last synchronization between the correspondent node and the reference node, after a lapse of a second period of time N.

15. A controlling method for synchronizing a reference node with a correspondent node, the method comprising:
   transmitting a first packet to the correspondent node;
   receiving a second packet with a reception time of the first packet recorded therein from the correspondent node;
   calculating a forward delay time using a transmission time and the reception time of the first packet time and the reception time of the first packet; and
   transmitting a third packet with the forward delay time to the correspondent node.

16. A controlling method for synchronizing a correspondent node with a reference node, the method comprising:
   receiving a first packet from the reference node;
   transmitting a second packet with a reception time of the first packet recorded therein to the reference node;
   receiving a third packet with a forward delay time from the reference node, wherein the forward delay time is calculated using a transmission time and the reception time of the first packet by the reference node;
   calculating a reverse delay time; and
   calculating an offset value for the synchronization using the forward delay time and the reverse delay time.

* * * * *